UNITED STATES PATENT OFFICE.

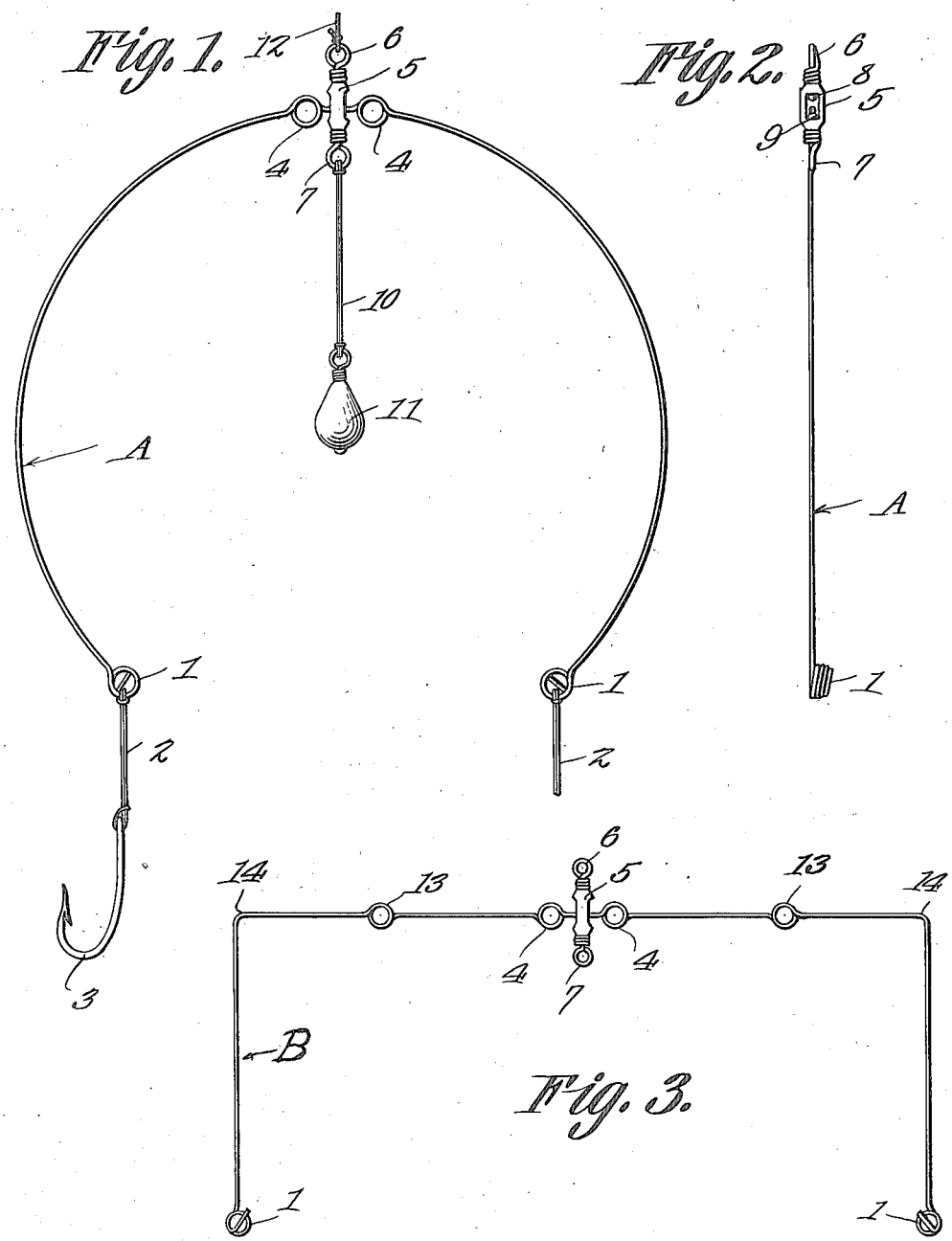

ROBERT S. WIESENFELD, OF BALTIMORE, MARYLAND.

FISH-HOOK SPREADER.

1,123,636.  Specification of Letters Patent.  Patented Jan. 5, 1915.

Application filed November 4, 1913. Serial No. 799,142.

*To all whom it may concern:*

Be it known that I, ROBERT S. WIESENFELD, a citizen of the United States, residing at Baltimore city, State of Maryland, have invented certain new and useful Improvements in Fish-Hook Spreaders, of which the following is a specification.

My invention relates to fish hook spreaders, and has for its object to provide a device for connecting the snells with the line in such a way that the hooks will be kept apart however the line be thrown, and will prevent the hooks from becoming entangled with the line however they may be swept by the current.

A further object being to provide a spreader of such construction that the strain on the spreader wire when compressed is distributed and thereby prevents the wire from bending suddenly at any one point.

With these, and other objects in view, the invention consists in certain novel features of construction, arrangement and combinations of parts which will be hereinafter described and pointed out in the claims.

Reference is had to the accompanying drawings forming a part of this specification, in which a preferred embodiment of my invention is illustrated, and in which similar characters of reference indicate corresponding parts in the several views, and in which,—

Figure 1 is a view in elevation of my improved spreader; Fig. 2 is a sectional view taken at right angles to Fig. 1, with parts removed, and Fig. 3 is an elevation of a modified form of spreader.

Referring to the drawings, A indicates the frame, made from a single piece of resilient wire, bowed or bent into a substantially semi-circular shape, and terminating in safety circular loop eyes or coils 1, the free ends of which terminate diametrically across the eyes. Attached to the eyes 1 are snells 2, the free ends of which are attached to the hooks 3. The spreader A at its center is bent to form two vertically disposed circular loops or coils 4, closely between which is loosely mounted upon the spreader a swivel head 5, upon which is provided eyes 6 and 7, by means of the swivel joints 8 and 9 respectively, thus permitting the spreader and the eyes 6 and 7 to revolve freely in the head 5. Attached to either one of these eyes is a line 10 to which is attached a weight or sinker 11, and to the other eye is attached the usual fishing line 12.

From the above description it will be seen that the loops or coils 4 are closely related to the swivel head 5, in a manner to retain the spreader centrally in said head.

In the modified form of spreader shown in Fig. 3, the frame B, is of a rectangular shape, having in addition to the circular loops or coils 4 shown in Fig. 1 of the preferred form, additional loops or coils 13, the purpose of the loops in each instance being to distribute the strain on the respective spreader wires when compressed and prevent the wires from bending too suddenly at any one point, the sudden strain being first taken up and absorbed by the loops upon the compression of the spreader wires, and upon their being further compressed the strain is distributed throughout the spreader wires, thereby preventing the spreader wires from bending too suddenly at any one point, the additional loops 13 provided in the modified form being for the purpose of giving to the spreader wire of the construction shown in that form additional resiliency occasioned by its shape, otherwise the strain on the wire when compressed would be more or less centered in the angular corners 14 and cause the spreader to bend at this particular point.

Having fully described my invention, what I claim and desire to secure by Letters Patent, is:—

1. A fish hook spreader, comprising a swivel head having swiveled eyes mounted in each end thereof, one of which is adapted to receive the end of the fish line and the other the sinker suspending means, a resilient frame formed of a single wire supported centrally in said swivel head and having its ends bent downwardly and formed with terminal eyes for the reception of hooks, and vertically disposed spring coils formed in the wire frame adjacent to and at each side of said swivel head to retain said wire frame centrally in said head and to absorb the strain imposed upon the frame when the ends are suddenly compressed.

2. A fish hook spreader, comprising a swivel head having swiveled eyes in each end thereof, one of which is adapted to receive the end of a fish line and the other the sinker suspending means, a resilient wire frame supported centrally in said swivel head and having its ends bent downwardly and formed with terminal eyes for the reception of hooks, vertically disposed spring coils formed in the wire frame adjacent to and at each side of said swivel head to retain said wire frame centrally, and additional spring coils formed in the wire frame between said first-mentioned coils and the ends of the frame which together with the first-mentioned coils absorb the strains imposed upon the frame when the ends are suddenly compressed.

In testimony whereof I affix my signature in presence of two witnesses.

ROBERT S. WIESENFELD.

Witnesses:
E. WALTON BREWINGTON,
HOWARD D. ADAMS.